US007912981B2

(12) United States Patent
May et al.

(10) Patent No.: US 7,912,981 B2
(45) Date of Patent: Mar. 22, 2011

(54) SYSTEM AND METHOD FOR INTELLIGENT DATA ROUTING

(75) Inventors: Scott M. May, Honeoye Falls, NY (US); Stephen A. Kovacsiss, III, Rochester, NY (US)

(73) Assignee: Robert Bosch GmbH, Stuttgart (DE)

( * ) Notice: Subject to any disclaimer, the term of this patent is extended or adjusted under 35 U.S.C. 154(b) by 1171 days.

(21) Appl. No.: 11/539,745

(22) Filed: Oct. 9, 2006

(65) Prior Publication Data

US 2008/0084876 A1 Apr. 10, 2008

(51) Int. Cl.
*G06F 15/16* (2006.01)
*G06F 12/00* (2006.01)
(52) U.S. Cl. ........................................ 709/238; 709/250
(58) Field of Classification Search .......... 709/223–224, 709/238–242
See application file for complete search history.

(56) References Cited

U.S. PATENT DOCUMENTS

| | | | |
|---|---|---|---|
| 5,195,126 A | 3/1993 | Carrier et al. | |
| 6,553,100 B1 | 4/2003 | Chen et al. | |
| 6,618,074 B1 | 9/2003 | Seeley et al. | |
| 6,624,750 B1 | 9/2003 | Marman et al. | |
| 6,898,632 B2 | 5/2005 | Gordy et al. | |
| 7,545,916 B2 * | 6/2009 | Schwartz | 379/45 |
| 2002/0177428 A1 | 11/2002 | Menard et al. | |
| 2003/0053486 A1 * | 3/2003 | Okamori | 370/474 |
| 2003/0067386 A1 * | 4/2003 | Skinner | 340/540 |
| 2003/0204619 A1 * | 10/2003 | Bays | 709/238 |
| 2003/0211839 A1 * | 11/2003 | Baum et al. | 455/403 |
| 2004/0046654 A1 | 3/2004 | Adams | |
| 2004/0230709 A1 * | 11/2004 | Moll | 710/1 |
| 2004/0246123 A1 | 12/2004 | Kawabe et al. | |
| 2005/0047379 A1 | 3/2005 | Boyden et al. | |
| 2005/0104725 A1 | 5/2005 | Leguillier | |
| 2006/0031291 A1 | 2/2006 | Beckemeyer | |
| 2006/0193447 A1 | 8/2006 | Schwartz | |
| 2008/0133773 A1 | 6/2008 | Kaneko et al. | |

OTHER PUBLICATIONS

Search report for corresponding EP Application No. 07016324.1-1244 issued by the European Patent Office on Jan. 21, 2010.

* cited by examiner

*Primary Examiner* — Zarni Maung
(74) *Attorney, Agent, or Firm* — Baker & Daniels LLP

(57) ABSTRACT

Embodiments of the invention relate to premise, fire, security, or access control systems and their associated communication devices that can receive data routing commands from a security programming or monitoring center, and to a lesser extent, those devices that receive and transmit those data routing commands. The data routing command may instruct the premise communication device to route data to a specific destination address. The data routing commands may instruct the premise communication device to redirect, repeat, or send the data to multiple destinations. More specifically, the data routing command may instruct the premise communication device to route audio/video (A/V) data streams or files to a specified server, monitoring center, or other security address destination. By intelligently routing incoming data to a specific location on command, the data can be redirected to areas of greatest need. This technique enables the monitoring center to process the incoming data efficiently.

30 Claims, 10 Drawing Sheets

SYSTEM AND METHOD FOR INTELLIGENT DATA ROUTING

TECHNICAL FIELD

Embodiments of the present invention relate to premise protection systems, which may include fire, security, access control, or other similar systems. More particularly, embodiments of the invention are directed to a system and method for facilitating data transmission between premise protection systems and a destination.

BACKGROUND OF THE INVENTION

Currently, in the field of premise protection systems, existing event communication systems typically send event information or premise data in the form of digital data to a monitoring center. The premise data is usually received, authenticated, and formatted to a standard protocol format by receiving equipment within the monitoring center. The receiving equipment passes the premise data to an automation system computer for storage and distribution. This automation system computer passes the data and general customer account information to an operator's terminal. Using the data, the monitoring center personnel can determine what steps should be taken for each incoming report.

In recent years, the types and quantity of data collected by premise protection systems have increased. With the additional data, such as Audio/Video (A/V) data and other non-standard alarm data, the monitoring center receives several pieces of information that need to be evaluated to determine the most appropriate response. Some monitoring center locations now require that in addition to the standard premise control data, another type of verification signal be provided in order to keep emergency response organizations, such as the police and fire departments, informed. The verification signal would typically originate from some type of A/V device.

Several different premise protection system configurations exist. FIG. 10 illustrates an example of an existing premise protection system 100 that may be associated with A/V equipment 110. Both the premise protection system 100 and the A/V equipment 110 may communicate with a monitoring center 140 including receiving equipment 150, automation equipment 160, and an operator's terminal 170. While the premise protection system 100 may implement a first network 120 for communication, the A/V equipment may implement a second discrete network 130 for communication with the receiving equipment 150 of the monitoring center 140.

Thus, the A/V equipment may include one or more totally independent A/V devices programmed to communicate collected data to a specific destination address when the data are triggered. The premise protection system may only receive an input signal notifying it that an A/V event activation occurred. Thus, the A/V equipment directs the A/V data to a pre-programmed specific destination address. In other systems, the A/V device communicates its data back through a premise control system of the premise protection system. The premise control system is often used as the communicator only and doesn't retain any of the data passed.

Concerns may arise when the A/V data is passed through the premise control system during the communication and the A/V data is sent as part of the premise event message. Using this method, the central station receiving equipment may be communicating for an extended time period while the A/V data is being received. This extended time period could delay other potentially important premise data signals from being received.

To avoid this delay, one solution is to add additional equipment and communication lines to handle the increased traffic load. This solution places a higher cost on the equipment requirements of the monitoring center and the personnel required to maintain the monitoring center.

Currently, in most cases, the link between the premise control system and the A/V device is limited. Usually the link includes a premise output trigger to signal the A/V device from the premise control system to start recording data or to send captured data. Future systems may be more integrated as the premise control system may have the capability to connect with and control more devices. The volume of data communicated to the monitoring center will also increase. Currently, in some systems, completion of a premise control transmission may consume approximately twenty seconds. Minimization of transmission time requires efficient management.

A/V device signals usually contain much more data than what is typically passed from the premise control system to the monitoring center. The most commonly used communication transport medium today is the Public Switched Telephone Network (PSTN). The typical premise protection control system communicates over a PSTN phone line at a baud rate of 300 baud. Accordingly, if for example, a high resolution picture were sent, a significant amount of additional time would be required to transmit the image for interpretation at the monitoring center.

The delay in receiving the A/V data prevents the monitoring center from responding in a timely fashion with the most appropriate response. For example, if the photograph shows that a family pet caused an alarm but because of the transmission delay, the monitoring center had already dispatched the police, then the extended transmission time contributed to a false alarm. Due to this type of communication delay, many of the A/V devices today have separate communicators used to send A/V data at substantially higher communication rates and over a variety of communication mediums. The A/V data is usually not passed back to the premise control system due to the communication bandwidth limitation and the limited storage capacity of the premise control system.

In this scenario and as shown in FIG. 10, when the A/V data is sent as an independent signal, the monitoring center may be required to determine how to link the independent event signals together. The additional data is generally sent to different destination addresses within the monitoring center in order to avoid overloading central receiving equipment with high bandwidth data. The data must then be retrieved and linked with the premise event data. Since the data come from independent devices, linking received data becomes a challenge.

Because premise protection systems send digital alarm event information as well as additional non-standard data information (video, audio, data) to the monitoring center, improved data management is necessary. The existing model involves either having independent transmission paths that do not share data or interact with each other, or burdening the alarm receiving equipment with the task of receiving both the control data and the additional data simultaneously, thus limiting the capacity, response time, and the ability of the receiver to process other alarms.

Accordingly, a solution is needed for intelligently routing data in order to avoid overloading a particular destination within the central monitoring center. A solution is also needed for routing data efficiently in order to improve response times and the ability to use all available data in determining an appropriate response.

BRIEF SUMMARY OF THE INVENTION

In one aspect, an intelligent data routing system for performing data routing from a monitoring center is provided.

The data routing is performed for data collected from a source device associated with a premise protection system. The intelligent data routing system includes receiving equipment for receiving source device information from the premise protection system. The intelligent data routing system additionally includes a routing command center for determining a destination for the collected data based on the source device information and available destination information.

In an additional aspect, a method may be provided for performing data routing from a monitoring center for data collected from a source device associated with a premise protection system. The method may include receiving a device identifier from the premise protection system, determining a routing destination based on the device identifier; and communicating the routing destination to the premise protection system.

In yet a further aspect, a method may be provided for performing data routing from a monitoring center for data collected from a source device associated with a premise protection system. The method may include receiving a device identifier from the premise protection system, determining a routing destination based on the device identifier, and routing the collected data internally from the monitoring center to the routing destination.

BRIEF DESCRIPTION OF THE DRAWINGS

The present invention is described in detail below with reference to the attached drawings figures, wherein.

DETAILED DESCRIPTION OF PREFERRED EMBODIMENTS

Embodiments of the present invention are directed to a system and method for intelligent routing of data collected by a premise protection system and/or associated devices producing high bandwidth data, such as A/V devices. A monitoring center or other data routing source may send data routing destination address information to the premise protection system or associated devices, such that the data can route directly to where the information is needed, thus shortening the response time and improving the ability to use all available data in determining the most appropriate response to an incoming event.

Embodiments of the invention allow premise protection systems to direct digital alarm event information as well as additional data information (video, audio, data) to an appropriate destination selected at the monitoring center. In accordance with embodiments of the invention, the monitoring center instructs the premise protection system to direct or redirect the audio/video/data information to a specified destination.

The system described herein allows modification of the destination without reprogramming of the premise protection system. Furthermore, in the monitoring center, the amount of bandwidth required to support A/V or other high bandwidth data would not limit the amount of digital alarm information that could be processed on the central station receiving equipment.

Figure 1:
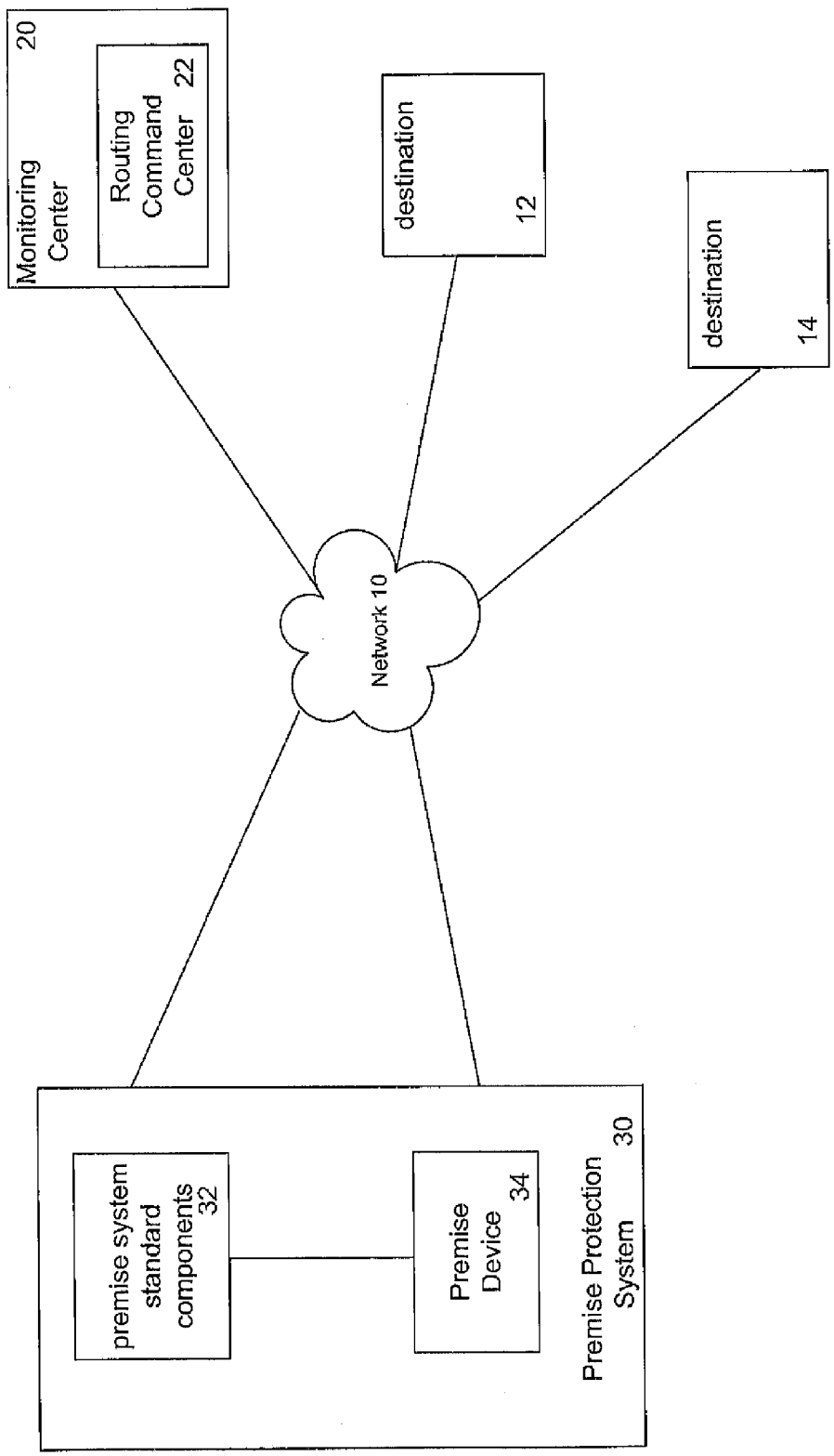
FIG. 1 is a block diagram illustrating an environment for implementing interactive intelligent data routing in accordance with an embodiment of the invention.

FIG. 1 is a block diagram illustrating components of a premise protection environment in which a premise protection system 30 communicates over a network 10 with a monitoring center 20. The premise protection system 30 may include standard premise components 32 connected with one or more premise devices 34. The standard premise components 32 may include sensors such as vibration sensors, heat sensors, motion sensors, etc. and may also include central controls for collecting data from these sensors. The standard premise components 32 are preferably included within a computing environment having a processor, memory, and communication component such as those illustrated in FIG. 4 and further described below.

The one or more premise devices 34 may include A/V equipment or other devices that collect non-standard format data or data that consumes a large amount of bandwidth. The devices 34 may communicate with the monitoring center 20 directly or alternatively, may receive monitoring center instructions through the standard premise components 32. The premise protection system 30 may also communicate over the network 10 with multiple destinations 12, 14. The premise protection system 30 may direct information from the premise devices 34 to the destinations 12 and/or 14, or to the monitoring center 20. The monitoring center 20 may include a routing command center 22 that determines an appropriate destination for information and data collected by the premise protection system 30. The monitoring center 20 may instruct the premise protection system 30 to route the data or may be equipped to internally route the data to both internal and external destinations.

As illustrated in FIG. 1, in a typical communication process, when the premise protection system 30 has data to be transmitted, it opens up one of its available communication network channels (PSTN, IP, RF, etc.) Through each individual communication link, a connection may be established between the premise protection system 30 and the monitoring center 20. A message is then transmitted by the premise protection system 30 and the message is acknowledged by the monitoring center 20.

Figure 2:
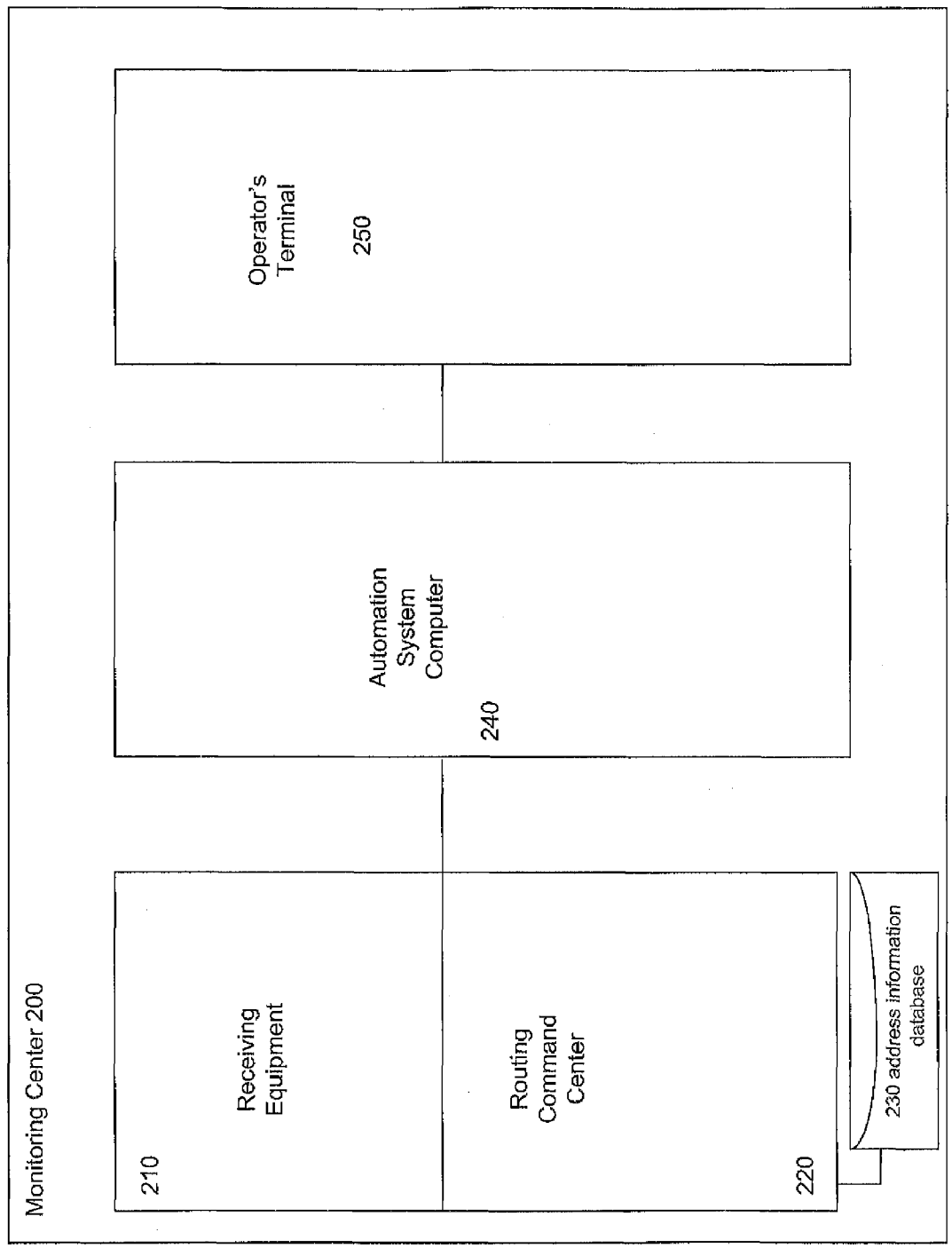
FIG. 2 is a block diagram illustrating components of a monitoring center in accordance with an embodiment of the invention.

FIG. 2 illustrates a monitoring center 200 in accordance with an embodiment of the invention. The monitoring center 200 may include receiving equipment 210, connected with an automation system computer 240, and an operator's terminal 250. A routing command center 220 is located within the monitoring center and is shown is connected with the receiving equipment 210. However, the routing command center 220 may be disposed in any appropriate location within the monitoring center 200. The routing command center 220 may be connected with an address information database 230.

The routing command center 220 may determine an appropriate destination for received information. In embodiments of the invention, the routing command center 220 includes a computer program that evaluates the availability of data destinations within the monitoring center and additionally determines whether to route data to locations external to the monitoring center. The routing command center 220 may access the database 230 to determine characteristics of the source device in making its destination determination. The routing command center 220 may also be controlled by an operator access the operator's terminal 250, such that the operator can interactively control data destinations.

The routing command center 220 may be connected with the address information database 230, which stores address information and other identifying data pertaining to potential data destinations and sources. The potential data destinations and sources may include those illustrated in FIG. 1 and others. This database 230 allows the details of devices and associated routing information to be stored in the monitoring center 200. Within the monitoring center 200, the address information database 230 may be stored within the receiving equipment 210 or automation equipment 240 or in an alternative location and is accessible to the routing command center 220, which may be incorporated in the receiving equipment 210 or the automation system computer 240.

A benefit of a monitoring center controlled database such as the address information database 230 is that in the event of a problem at the monitoring center 200, the source devices could be instructed to send their information to an alternate destination address. This would prevent data from being lost if there was a problem at the primary destination address.

Figure 3:
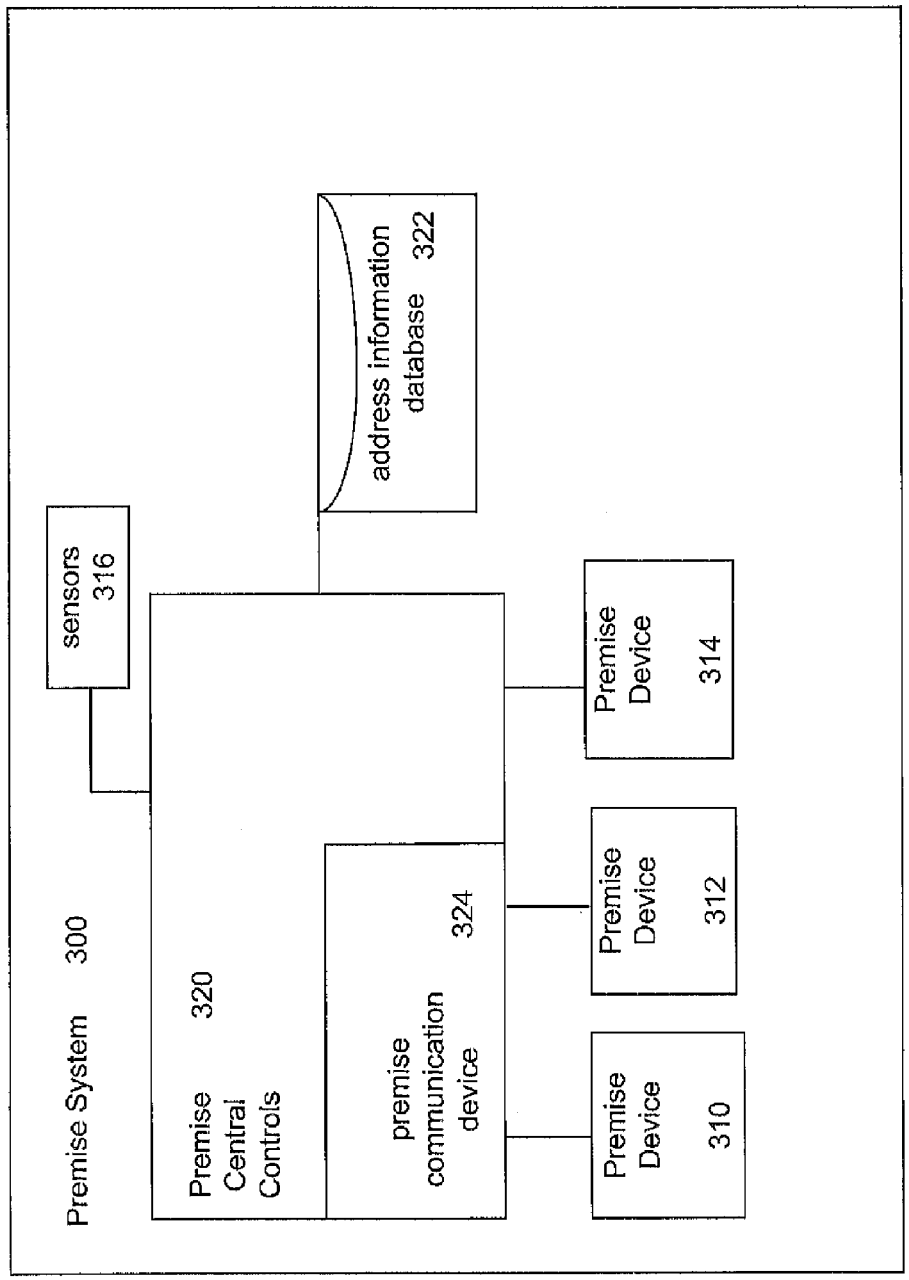
FIG. 3 is a block diagram illustrating a premise protection system environment in accordance with an embodiment of the invention.

FIG. 3 is a block diagram illustrating an embodiment of a premise protection system 300. The premise protection system 300 may include standard premise protection components such as premise central controls 320 that cooperate with various premise devices 310, 312, and 314 and sensors 316, which may include standard data collection components such as motion sensors, heat sensors, vibration sensors, etc. The premise central controls 320, which may be incorporated in a computerized environment such as that illustrated in FIG. 4, may include a premise communication device 324 for communicating with the monitoring center.

The various premise devices 310, 312, 314 may include video cameras and/or other types of recording devices. The premise devices 310, 312, 314 may include devices that collect data in a non-standard format or devices that collect data that consumes a large amount of bandwidth. Although these devices 310, 312, and 314 are located within the premise protection system 300 and are shown as connected with the premise central controls 320, these devices may also be independent of the premise central controls 320. In the latter case, the devices 310, 312, and 314 would collect data and report directly to the monitoring center 200 through their own communication devices.

Optionally, the premise central controls 320 may be connected with an address information database 322. This database is configured to function substantially in accordance with the description of the database 230 as explained above. Because of the many different communication paths the data can take to reach the destination address, the premise protection system 300 and/or the monitoring center 200 preferably maintain a database 230 and/or 322 of the source device address information. This information provides knowledge to facilitate determination of which devices are available for that specific system configuration.

Figure 4:
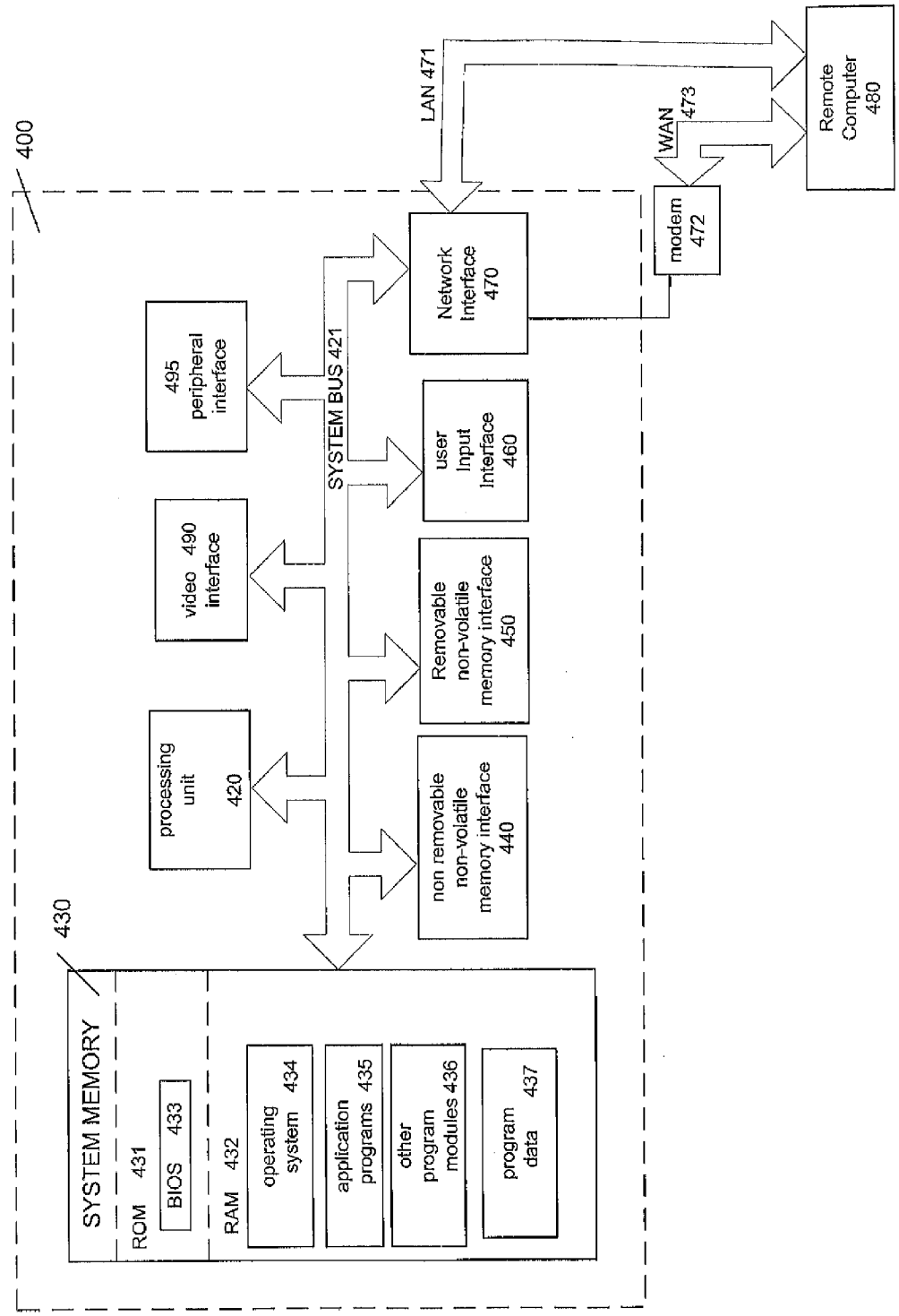
FIG. 4 is a block diagram illustrating a computerized environment in accordance with an embodiment of the invention.

Both the premise protection system 300 and the monitoring center 200 exist within and/or include a computerized environment. Individual components of the premise protection system 300 and the monitoring center 200 may exist within the same or separate computing environments. An exemplary computerized environment is illustrated in FIG. 4. The computerized environment, may include a computing device 400. The computing device 400 may include a system memory 430 and a processing unit 420 connected over a system bus 421. Other types of memory resources such as non-removable, nonvolatile memory interface 440 and removable non-volatile memory interface 450 may be connected over the system bus 421. Interfaces, such as a video interface 490, peripheral interface 495, user input interface 460, and network interface 470 may also be connected over the system bus 421.

The network interface 470 may allow connection between components such as a remote computer 480 through the use of a LAN 471, WAN 473, or other network. In embodiments of the invention, the network interface 470 may connect using a modem 472 with the remote computer 480.

The system memory 430 may include computer storage media in the form of volatile and/or nonvolatile memory such as read only memory (ROM) 431 and random access memory (RAM) 432. A basic input/output system (BIOS) 433, containing the basic routines that help to transfer information between elements within the system, such as during start-up, is typically stored in ROM 431. RAM 432 typically contains data and/or program modules that are immediately accessible to and/or presently being operated on by processing unit 420.

The RAM 432 may include an operating system 434, application programs 435, other program modules 436, and program data 437. Programs stored in RAM 432 may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including multiprocessor systems, microprocessor-based or programmable consumer electronics, minicomputers, mainframe computers, and the like.

The computing system 400 may also include other removable/non-removable, volatile/nonvolatile computer storage medias as shown at 440 and 450. A hard disk drive may be provided that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive is typically connected to the system bus 421 through a non-removable memory interface. The magnetic disk drive and optical disk drive are typically connected to the system bus by a removable memory interface.

A user may enter commands and information through the user input interface 460 using input devices such as a keyboard and pointing device, commonly referred to as a mouse, trackball or touch pad. Other input devices may include a microphone, satellite dish, scanner, or the like. These and other input devices are often connected to the processing unit 420 through the user input interface 460 that is coupled to the system bus 441, but may be connected by other interface and bus structures, such as a parallel port or a universal serial bus (USB). A monitor or other type of display device and other peripherals may also be connected to the system bus 421 via an interface, such as the peripheral interface 495.

The illustrated computer system 400 is merely an example of a suitable environment for the system of the invention and is not intended to suggest any limitation as to the scope of use or functionality of the invention. Neither should the system 400 be interpreted as having any dependency or requirement relating to any one or combination of components illustrated.

The computer system 400 in embodiments of the present invention may operate in a networked environment using logical connections to communicate with networked components. Logical connections for networking may include a local area network (LAN) or a wide area network (WAN), but may also include other networks. When used in a LAN networking environment, the system may be connected to the LAN through the network interface 470 or adapter. When used in a WAN networking environment, the system 400 typically includes a modem 472 or other means for establishing communications, such as the Internet. The modem, which may be internal or external, may be connected to the system bus 421 via the network interface 470 or other appropriate mechanism.

Figure 5:
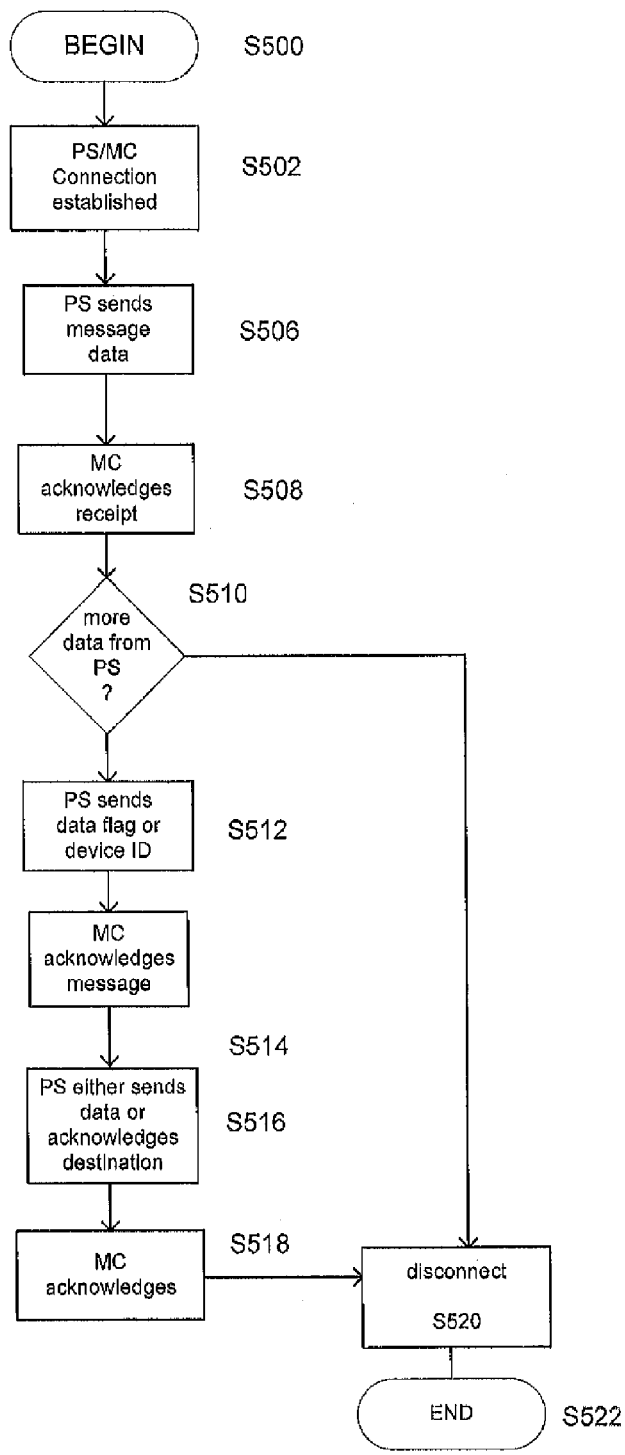
FIG. 5 is a flow chart illustrating intelligent interactive data routing in accordance with an embodiment of the invention.

FIG. 5 is a flowchart illustrating a method for interactive intelligent data routing in accordance with an embodiment of the invention. The data routing may be performed through the routing command center 220 as illustrated in FIG. 2 and the address information database 230.

The method begins in S500 and in S502, a connection is established between the premise protection system and the monitoring center. The initial data communication exchange of S502 uses existing security communication format protocols. The initial data communication may be made through a connection handshake originating from the monitoring center or the premise protection system. To send standard data, the premise protection system communicates over the available communication channel using the premise communication device 324 as pre-programmed over available connections. In S506, after a connection has been established, the premise protection system sends message data to the monitoring center. In S508, when data transfer is complete, the monitoring center acknowledges receipt of the message data.

In S510, at the end of the standard data communication format, which typically does not support A/V or other high bandwidth or non-standard format data, the monitoring center may wait for additional information from the premise protection system. The monitoring center may implement a delay during which it determines whether the premise protection system has more data. If there is no additional data in S510, after remaining connected for a predetermined additional time period, the monitoring center and the premise protection system may disconnect in S520.

If the premise protection system or one of its associated devices has more data to transmit in S510, the communication component of the premise protection system, or alternatively a premise device such as an A/V device of the premise protection system, sends a data flag or device identifier in S512 after standard communication has completed. This device identifier information would either be the device's actual source address or the device's ID. The monitoring center acknowledges receipt in S514 and in embodiments of the method, will send a destination to the premise protection system. Accordingly, the premise protection system either sends the data in S516 or acknowledges the destination. The monitoring center sends an acknowledgement in S518 and the premise protection system and the monitoring center disconnect in S520. The process ends in S522.

The device identifier data received at the monitoring center in S512 would either be direct or indirect with regard to the device source address. Direct data would contain the actual source device's routing information and path. In S514, the monitoring center would send specific routing information to the device specified. In embodiments of the invention, the monitoring center sends the routing information through the central controls of the premise protection system. In other embodiments, the monitoring center sends the routing information directly to the premise device. If the data is indirect, then the monitoring center receives a device ID from the premise protection system in S512. The device ID along with other information may be used to look up the actual source address information from a database, such as the address information database illustrated in FIGS. 2 and 3.

Figure 6:
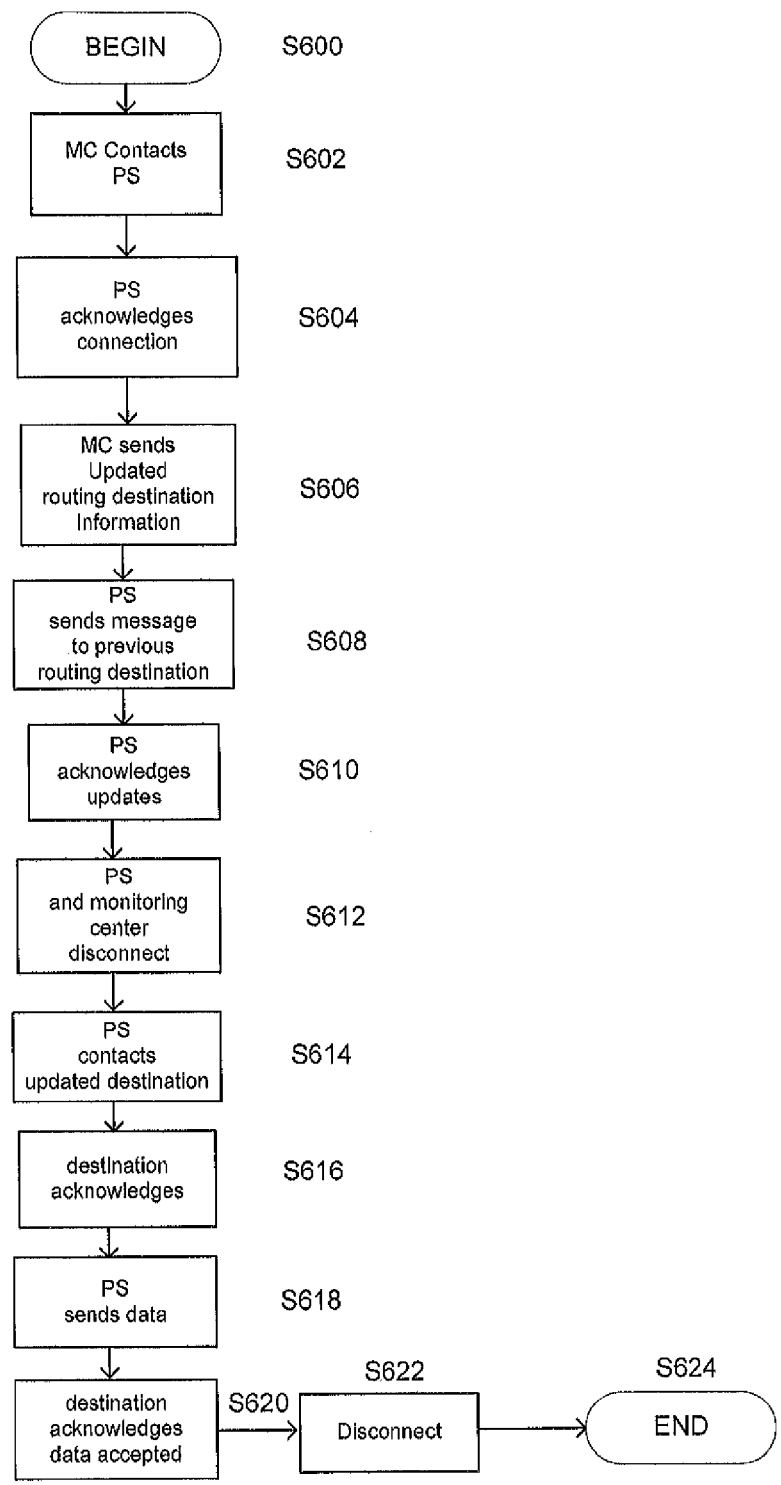
FIG. 6 is a flow chart illustrating a method for updating a destination address in accordance with an embodiment of the invention.

FIG. 6 illustrates a method for updating a pre-programmed destination address in accordance with an embodiment of the invention. The method begins in S600 and the monitoring center contacts the premise protection system in S602. In S604, the premise protection system acknowledges the connection. In S606, the monitoring center sends updated routing destination information required to reconfigure the communication device of the premise protection system or associated premise device. The message containing the routing destination address information may also include additional information regarding other aspects of data (for example: formatting, compression, file type, time, encryption, etc). Intelligent interactive security data routing would apply to the data content as well as the destination address.

In S608, after the premise protection system receives a new routing destination address, it sends a message to the previous routing destination indicating that the address has been changed. Although this step is not required and may optionally be included, it adds an additional level of security to the system to prevent tampering and/or take-over. In S610, the premise protection system acknowledges the updates.

In S612, the premise protection system and monitoring center disconnect. In S614, the premise protection system contacts the updated destination. In S616, the destination acknowledges receipt and S618, the premise protection system sends data. In S620, the destination acknowledges the data as accepted. In S622, the premise protection system disconnects from the destination and the method ends in S624.

Figure 7:
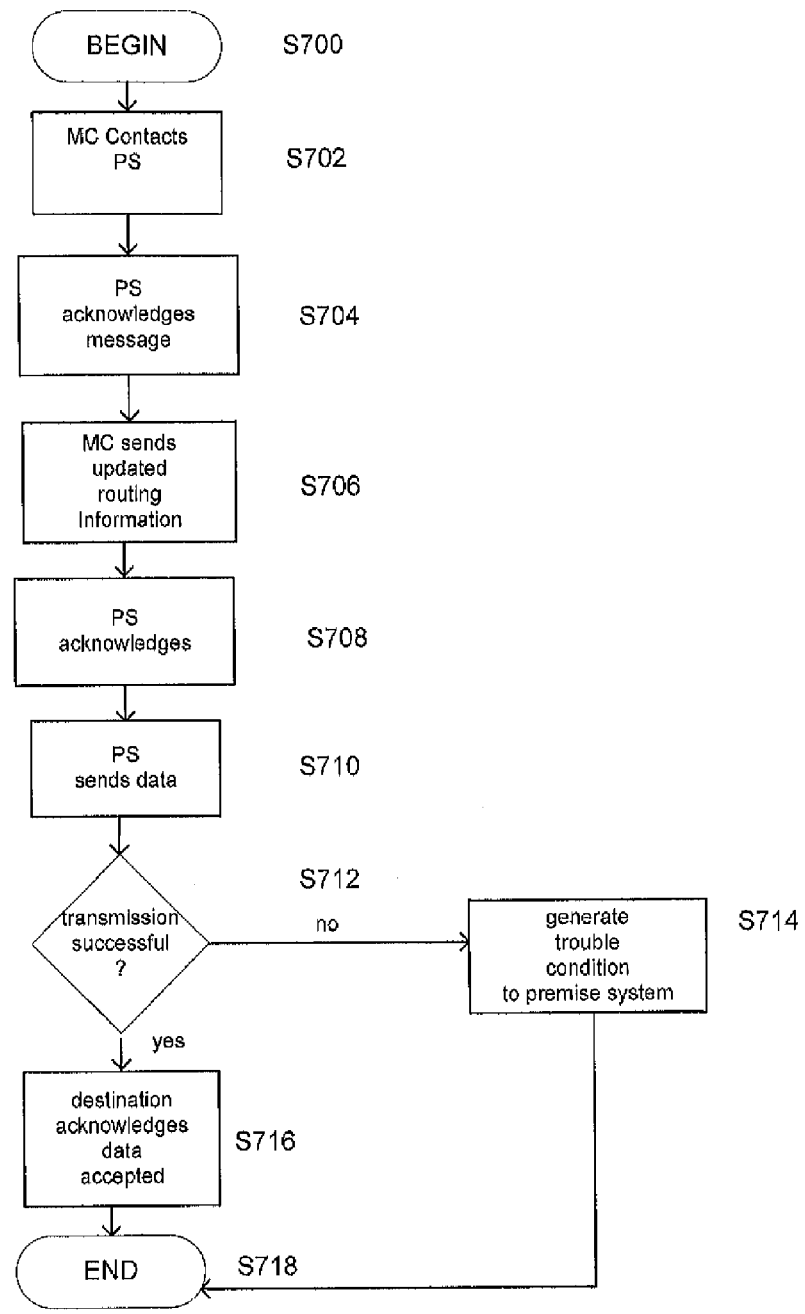
FIG. 7 is a flow chart illustrating a direct connect method for intelligently routing data in accordance with an embodiment of the invention.

FIG. 7 illustrates a direct connect method in accordance with an embodiment of the invention. The method begins in S700. The monitoring center contacts the premise protection system in S702. The premise protection system acknowledges the message in S704. The monitoring center sends updated routing information in S706 indicating that updated destination address so that the premise protection system can immediately transmit the data to the updated destination. In S708, the premise protection system acknowledges the routing information. In S710, the premise protection system sends data.

If the transmission is unsuccessful including retry attempts at S712, a trouble condition may be generated in S714. If the transmission is successful in S712, the destination acknowledges the data as accepted in S716. S716 may optionally be included and may in particular be desirable in cases in which the destination address is outside of the monitoring center. The method ends in S718.

Figure 8:
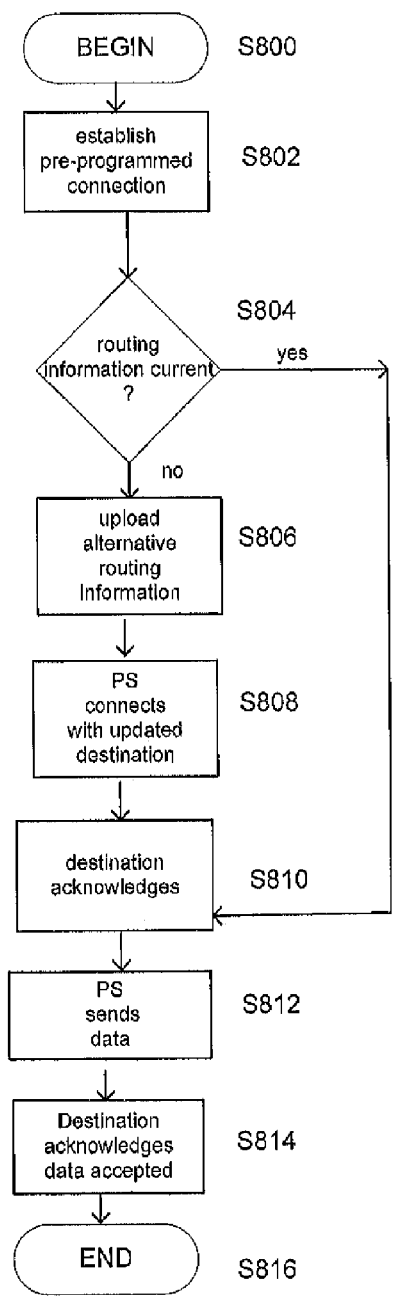
FIG. 8 is a flow chart illustrating a method for intelligent data routing in accordance with an additional embodiment of the invention.

FIG. 8 illustrates a further embodiment of the method of the invention in which the premise protection system is able to make a pre-programmed connection prior to the interactive data routing. The method begins in S800 and the premise protection system establishes a pre-programmed connection in S802. In S804, if the routing information is not current, the monitoring center uploads alternative routing or destination address information in S806. The premise protection system connects with the updated destination in S808 and the destination acknowledges the connection in S810. Alternatively, if the routing information is current S804, no updating is necessary and the destination acknowledges the connection in S810.

In S812, the premise protection system sends the data to the destination and in S814, the destination acknowledges the data as accepted. The method ends in S816.

Figure 9:
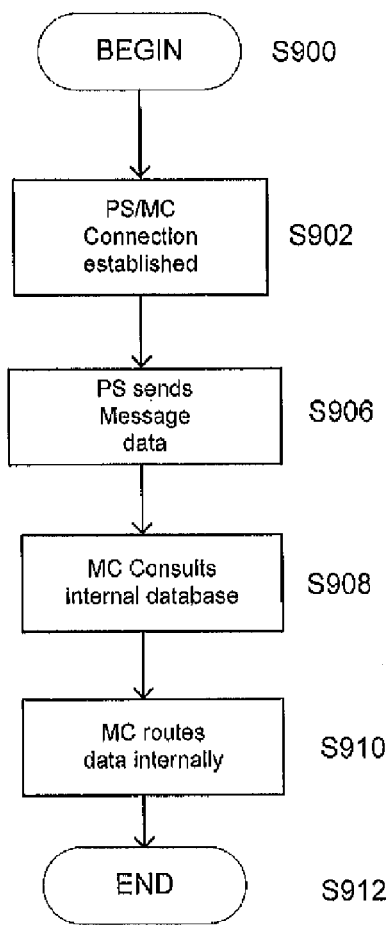
FIG. 9 is a flow chart illustrating data routing in accordance with an additional embodiment of the invention.
Figure 10:
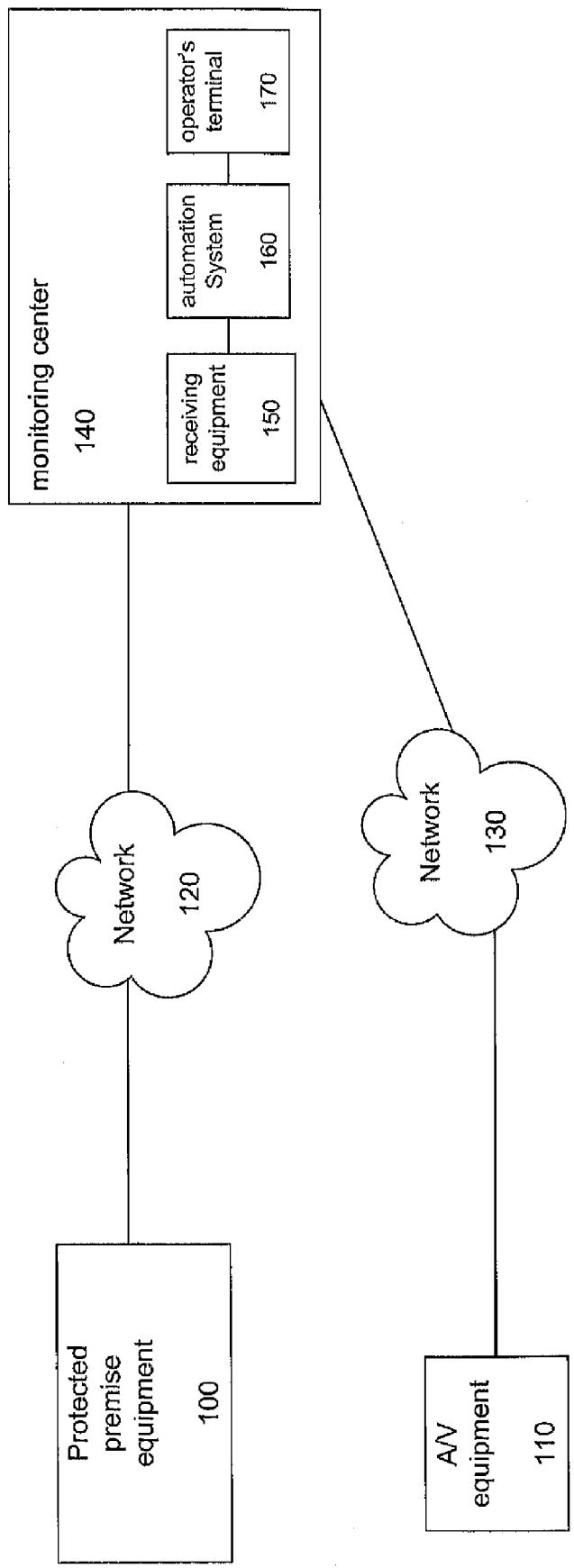
FIG. 10 is a block diagram illustrating a conventional data routing scheme.

FIG. 9 illustrates an additional embodiment of the method of the invention. In this embodiment, the address information database at the monitoring center includes the capability to route data internally to a specified destination address. Thus, the routing may be controlled entirely by the monitoring center without altering any external devices. The method begins in S900 and in S902, a premise protection system/monitoring center connection is established. The connection may be established through a connection handshake originating at the monitoring center or at the premise protection system. In S906, the premise protection system sends message data. In S908, the monitoring center consults an internal database containing routing information. In S910, the monitoring center routes the data internally. The method ends in S912. The internal routing illustrated by the method of FIG. 9 provides improved control over received data, but requires additional and/or improved monitoring center equipment.

The data routing of S910 may occur in a number of different ways. For instance, a premise protection system call may be transferred to a pre-preprogrammed destination. Alternatively, the monitoring center may internally route the call by automatically placing the call on hold at a predetermined location so that an external handset or other device can be activated to listen to the call. Also, the monitoring center may internally modify data before routing it to a destination. For example, the monitoring center may receive a video signal in a first format and convert it to another second format before sending the video signal.

It should be understood that although the methods described above refer to communication between the premise protection system and the monitoring center, the premise protection system can refer to either a data collection device (such as devices 310, 312, 314, of FIG. 3) located on the protected premises or the central controls 320 of the premise system 300. Thus, the devices 310, 312, and 314 may communicate independently with the monitoring center in embodiments of the invention.

Furthermore, with regard to routing destinations, it should be understood that the routing destinations may be located within the monitoring center 200 and/or outside of the monitoring center 200. One set of data may be routed to multiple destinations both inside and outside of the monitoring center 200.

If in any of the above-described situations, if the premise device could not complete the transmission of its data to the destination address it was routed to, it could generate a local trouble condition to the main premise protection system or premise controls that could also be communicated to the monitoring center indicating a communication failure.

Also, in any of the methods described above with reference to FIGS. 5-9, the monitoring center may instruct the premise protection system to send information directly to the police, fire, or other security agency. The agency could then use the information at its discretion in apprehension of intruders or location of fire or other disturbance. Furthermore, the routing command center may require routing of information to several destination addresses simultaneously. This scenario may allow for example, for data to be routed directly to a police vehicle, to be analyzed for additional information at a laboratory facility, and to be stored for later retrieval.

The above-described methods allow the monitoring center to work with the existing devices that do not have the ability to support the additional information directly. This method gives the monitoring center forward and backward compatibility with the existing premise protection systems and communication formats.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. An intelligent data routing system for controlling data routing from a monitoring center for data collected from a source device associated with a premise protection system, the intelligent data routing system comprising:
   receiving equipment for receiving a first message and a second message from the premise protection system upon the detection of an alarm event by the premise protection system, the first message including alarm event information and the second message including source device information, the second message notifying the monitoring center of the presence of data collected from the source device and associated with the alarm event; and
   a routing command center for determining a destination for the collected data based on the source device information of the second message and available destination information.

2. The intelligent data routing system of claim 1, wherein the routing command center communicates the determined destination to the premise protection system, the premise protection system routing the collected data to the determined destination.

3. The intelligent data routing system of claim 1, wherein the source device information comprises at least one of a source device address and a device ID.

4. The intelligent data routing system of claim 3, further comprising an address information database connected with the routing command center, the address information database including source device address information.

5. The intelligent data routing system of claim 4, wherein the address information database determines the source device address based on the device ID.

6. The intelligent data routing system of claim 1, wherein the destination information comprises storage capability information.

7. The intelligent data routing system of claim 1, wherein the routing command center is configured to determine an updated destination and to communicate the updated destination to the premise protection system.

8. The intelligent data routing system of claim 1, wherein the first message and the second message are in a first data format and the collected data is in a second data format, the first data format requiring less bandwidth for transmission from the premise protection system than the second data format.

9. The intelligent data routing system of claim 8, wherein the first message and the second message are communicated from the premise protection system over a first communication path and the collected data is communicated from the premise protection system over a second communication path.

10. The intelligent data routing system of claim 1, wherein the source device information is collected by a source device that operates independently from central controls of the premise protection system.

11. The intelligent data routing system of claim 1, wherein the premise protection system is configured to route the collected data to the monitoring center and the monitoring center is configured to route the collected data to the determined destination.

12. The intelligent data routing system of claim 1, wherein the receiving equipment and the routing command center are located at the monitoring center.

13. The intelligent data routing system of claim 1, wherein the second message is transmitted directly from the source device to the receiving equipment.

14. A method for controlling data routing from a monitoring center for data collected from a source device associated with a premise protection system, the method comprising:
receiving alarm event information and a source device identifier from the premise protection system upon the detection of an alarm event by the premise protection system, the source device identifier notifying the monitoring center of the presence of data collected from the source device and associated with the alarm event;
determining a routing destination for the collected data based on the source device identifier; and
communicating the routing destination to the premise protection system.

15. The method of claim 14, wherein the source device identifier comprises one of a source device ID and a source device address.

16. The method of claim 14, wherein determining a routing destination comprises consulting an address information database containing characteristics of the source device.

17. The method of claim 14, wherein determining a routing destination comprises determining multiple routing destinations for the collected data.

18. The method of claim 17, wherein the routing destinations include destinations external to the monitoring center.

19. The method of claim 14, further comprising sending the collected data from the premise protection system to the routing destination.

20. The method of claim 14, wherein the source device identifier identifies a source device that operates independently from central controls of the premise protection system.

21. The method of claim 14, wherein the monitoring center receives the source device identifier following a delay period after the receipt of the alarm event information.

22. A method for controlling data routing from a monitoring center for data collected from a source device associated with a premise protection system, the method comprising:
receiving a source device identifier from the premise protection system upon the detection of an alarm event by the premise protection system, the source device identifier notifying the monitoring center of the presence of the collected data at the premise protection system;
determining a routing destination for the collected data based on the source device identifier;
receiving the collected data at the monitoring center from the premise protection system; and
routing the collected data internally from the monitoring center to the routing destination.

23. The method of claim 22, wherein determining a routing destination comprises determining multiple routing destinations for the collected data, wherein the routing destinations include destinations external to the monitoring center.

24. The method of claim 22, wherein the collected data is associated with the alarm event.

25. The method of claim 22, wherein the device identifier identifies a source device that operates independently from central controls of the premise protection system.

26. The method of claim 22, wherein the source device identifier is received from the premise protection system over a first communication path and the collected data is received from the premise protection system over a second communication path.

27. The method of claim 26, further comprising receiving alarm event information from the premise protection system over the first communication path upon the detection of the alarm event by the premise protection system.

28. The method of claim 27, wherein the collected data communicated over the second communication path consumes a higher bandwidth than the source device identifier and the alarm event information communicated over the first communication path.

29. The method of claim 28, wherein the collected data communicated over the second communication path includes at least one of audio data and video data.

30. The method of claim 22, further comprising converting the collected data from a first format to a second format prior to routing.

* * * * *